US012583566B2

(12) United States Patent
Fang et al.

(10) Patent No.: US 12,583,566 B2
(45) Date of Patent: Mar. 24, 2026

(54) UNMANNED VESSEL-BASED MAINTENANCE DECISION-MAKING METHOD FOR DIAGNOSING SEDIMENTATION IN DRAINAGE PIPELINES AND PROVIDING EARLY WARNING FOR WATERLOGGING

(71) Applicant: Zhengzhou University, Zhengzhou (CN)

(72) Inventors: Hongyuan Fang, Zhengzhou (CN); Danyang Di, Zhengzhou (CN); Jian Li, Zhengzhou (CN); Zhaoyang Zhang, Zhengzhou (CN); Bin Sun, Zhengzhou (CN); Bin Li, Zhengzhou (CN); Niannian Wang, Zhengzhou (CN); Jinping Zhang, Zhengzhou (CN); Kejie Zhai, Zhengzhou (CN)

(73) Assignee: Zhengzhou University, Zhengzhou (CN)

( * ) Notice: Subject to any disclaimer, the term of this patent is extended or adjusted under 35 U.S.C. 154(b) by 0 days.

(21) Appl. No.: 18/817,999

(22) Filed: Aug. 28, 2024

(65) Prior Publication Data

US 2025/0388307 A1      Dec. 25, 2025

(30) Foreign Application Priority Data

Jun. 21, 2024     (CN) .......................... 202410811523.8

(51) Int. Cl.
*G06N 3/0464* (2023.01)
*B63G 8/00* (2006.01)
(Continued)

(52) U.S. Cl.
CPC ........... B63G 8/001 (2013.01); G06N 3/0464 (2023.01); G06N 3/0985 (2023.01);
(Continued)

(58) Field of Classification Search
CPC .............. B63G 8/001; B63G 2008/002; G06N 3/0464; G06N 3/0985; G06T 7/0004; G06T 2207/10048; G06V 20/05; G06V 20/56
See application file for complete search history.

(56) References Cited

FOREIGN PATENT DOCUMENTS

| CN | 2453065 Y | 10/2001 |
| CN | 213354801 U | 6/2021 |
| | (Continued) | |

OTHER PUBLICATIONS

Li, C., Chen, K., Li, H., & Luo, H. (2024). Multisensor data fusion approach for sediment assessment of sewers in operation. Engineering Applications of Artificial Intelligence, 132, 107965. (Year: 2024).*

(Continued)

*Primary Examiner* — Andrew M Moyer
*Assistant Examiner* — Dylan John Mendez Muniz
(74) *Attorney, Agent, or Firm* — Getech Law LLC; Jun Ye

(57) ABSTRACT

This invention relates to the diagnosis of sedimentation in drainage networks, specifically providing an unmanned underwater vehicle (UUV) based maintenance decision-making method for drainage pipeline sedimentation diagnosis and waterlogging warning. The UUV of this invention consists of an integrated hull inside the pipeline and a manhole box. The integrated hull inside the pipeline includes a Doppler ultrasound module, a three-axis gyroscope, a high-definition infrared camera, a main controller, a deep learning development board, baffles, a cabin cover, a cabin, fins, towing rings, and a navigation interface. The Doppler ultrasound module, three-axis gyroscope, high-definition infrared camera, navigation interface, and deep learning development board are each connected to the main (Continued)

controller. The fins, towing rings, cabin cover, and baffles are connected to the cabin.

8 Claims, 4 Drawing Sheets

(51) Int. Cl.

| | | |
|---|---|---|
| *G06N 3/0985* | (2023.01) | |
| *G06T 7/00* | (2017.01) | |
| *G06V 20/05* | (2022.01) | |
| *G06V 20/56* | (2022.01) | |

(52) U.S. Cl.
   CPC ............ *G06T 7/0004* (2013.01); *G06V 20/05* (2022.01); *G06V 20/56* (2022.01); *B63G 2008/002* (2013.01); *G06T 2207/10048* (2013.01)

(56) References Cited

FOREIGN PATENT DOCUMENTS

| | | | | | |
|---|---|---|---|---|---|
| CN | 118096701 A | * | 5/2024 | .............. | G06N 3/08 |
| CN | 118152847 A | | 6/2024 | | |

OTHER PUBLICATIONS

Liu, Shuang, Lide Fang, and Hanyang Liu. "Research on Doppler Flow Rate of the Urban Sewage Detecting Robot." 2024 Academic Conference of China Instrument and Control Society (ACCIS). IEEE, 2024. (Year: 2024).*
CN202410811523.8—First Office Action mailed on Mar. 15, 2025, 24 pages. (with English translation).
CN202410811523.8—Second Office Action mailed on May 8, 2025, 14 pages. (with English translation).
CN202410811523.8—Notice of Grant of Patent Right for Invention mailed on Jul. 28, 2025, 8 pages. (with English translation).

* cited by examiner

UNMANNED VESSEL-BASED MAINTENANCE DECISION-MAKING METHOD FOR DIAGNOSING SEDIMENTATION IN DRAINAGE PIPELINES AND PROVIDING EARLY WARNING FOR WATERLOGGING

TECHNICAL FIELD

This invention relates to the diagnosis of sedimentation in drainage pipeline networks and maintenance decision-making, specifically providing an unmanned underwater vehicle (UUV) based maintenance decision-making method for drainage pipeline sedimentation diagnosis and waterlogging warning.

BACKGROUND ART

In recent years, urban waterlogging has frequently occurred in China, posing a serious threat to the daily life and property safety of residents and a big challenge for waterlogging risk control. Existing studies can take a comprehensive view of the simulation of runoff yield and concentration and hydraulic processes of pipeline networks under heavy rainfall of different return periods while constructing waterlogging warning and prevention decision-making systems. However, these studies assume drainage networks are unobstructed, overlooking the impact of pipeline defects on discharge capacity and velocity distribution. In reality, urban construction in China has long emphasized above-ground infrastructure at the expense of underground systems, resulting in severely inadequate management of underground drainage networks.

The key consulting project "Strategic Research on Urban Underground Infrastructure Safety Management" of the Chinese Academy of Engineering reveals that major cities nationwide average over 12 functional defects per kilometer of drainage pipelines, with sedimentation and scaling defects accounting for more than 80%, which significantly hinder drainage and thus contribute to waterlogging. Moreover, maintenance of urban drainage networks has traditionally focused on reactively addressing immediate issues rather than employing a proactive, multi-objective smart decision-making platform that takes factors like sedimentation diagnosis and waterlogging warnings into consideration.

The current challenges in the pipeline sedimentation diagnosis and maintenance industry include:

I. Inaccurate diagnosis: Traditional methods suffer from low reliability due to corrosive and low-visibility environments in urban drainage networks. Current flow measurement devices have a relatively low level of accuracy with error rates fluctuating between 8% and 11%. There is a lack of research on neural networks for extracting fine details of complex pipeline defect characteristics;

II. Difficult measurement: Traditional pipeline robots are unable to navigate through sediment and scale under full-flow or clogged conditions, and perform patrol diagnostic operation throughout the pipeline network. Algorithms for precise defect boundary detection need further exploration and the performance evaluation of deep learning models requires improvement;

III. Low efficiency: Traditional pipeline robots diagnose pipelines segment by segment, leading to delayed responses and inefficiencies. They also cannot predict blockages or issue early warnings, necessitating the development of novel AI-based pipeline defect detection technologies. Improving intelligent sedimentation diagnosis models requires refining loss function optimization processes with theoretical knowledge-guided control equations and boundary constraints to mitigate output distortions.

DISCLOSURE OF INVENTION

Based on the needs of natural scientific research, experimentation, and standardized services, the objective of this invention is to overcome the shortcomings of existing technologies and provide a UUV-based maintenance decision-making method for drainage pipeline sedimentation diagnosis and waterlogging warning, thereby achieving automation and intelligence in real-time monitoring of drainage pipeline flow, sedimentation diagnosis, waterlogging warnings, and pipeline maintenance decision-making, and improving measurement efficiency and accuracy.

This invention adopts the following technical solutions to achieve the above objectives. First, it provides a UUV that consists of an integrated hull inside the pipeline and a manhole box. The integrated hull inside the pipeline includes a Doppler ultrasound module, a three-axis gyroscope, a high-definition infrared camera, a main controller, a deep learning development board, baffles, a cabin cover, a cabin, fins, towing rings, and a navigation interface. The Doppler ultrasound module, three-axis gyroscope, high-definition infrared camera, navigation interface, and deep learning development board are each connected to the main controller. The fins, towing rings, cabin cover, and baffles are connected to the cabin. The main controller is set on the cabin, and the deep learning development board is loaded with a drainage pipeline sedimentation diagnosis model, a waterlogging warning model, and an optimal maintenance decision-making model based on multi-objective optimization and waterlogging damage assessment methods.

The manhole box includes a floating towing cable, a lithium battery, a non-contact liquid level gauge for pipelines, a wireless communication module, a whip-like transmitting antenna, a box, a box cover, and fixing claws. The floating towing cable, lithium battery, wireless communication module, non-contact liquid level gauge for pipelines, and whip-like transmitting antenna are all fixed inside the box. The whip-like transmitting antenna is connected to the wireless communication module. The fixing claws and box cover are connected to the box. The non-contact liquid level gauge for pipelines, lithium battery, and wireless communication module (which is connected to an external server) are connected to the floating towing cable linked with the navigation interface.

Second, this invention provides a method for diagnosing drainage pipeline sedimentation, which is applied to the aforementioned UUV, comprising:

S1. Screening infrared images of drainage pipeline inlets and outlets captured by the UUV. The criteria for screening images require that the internal walls on both sides horizontally in the drainage pipeline are displayed within the image frame, with the interface between air and water clear. The images include light intensity, noise intensity, and factors causing missing points in the capture, and must be taken from multiple shooting angles;

S2. Using image annotation tools to annotate the screened infrared images to obtain infrared images of drainage pipeline inlets and outlets with annotated interfaces between air and water;

S3. Based on the infrared images of drainage pipeline inlets and outlets with annotated interfaces between air and water, combined with pre-measured Doppler ultrasound data and data about the inlet and outlet flow and sedimentation of drainage pipelines, constructing training, validation, and test sets for the sedimentation diagnosis model of drainage pipelines; and S4. Training the drainage pipeline sedimentation diagnosis model by using its training, validation, and test sets. Tuning hyperparameters involve decoupled weight decay magnitude, batch size, maximum iterations, learning rates, and momentum coefficients. After completion of training, the optimal drainage pipeline sedimentation diagnosis model is obtained and the diagnosis results of sedimentation in the drainage pipelines in the study area are output;

The deep learning algorithm in the drainage pipeline sedimentation diagnosis model consists of Gramian Angular Summation Field (GASF), convolutional neural networks (CNNs), bidirectional long short-term memory (LSTM) neural networks, and attention mechanisms. Physics-guided deep learning algorithms are embedded in the pipeline sedimentation diagnosis model, and such physics is extracted from the hydraulic models of changes in drainage pipeline inlet and outlet flow at different levels of sedimentation;

Further, the drainage pipeline sedimentation diagnosis model comprises an intelligent pipeline flow measurement module and an intelligent pipeline sedimentation diagnosis module;

The measurement process of the intelligent pipeline flow volume measurement module comprises:

S21. Using Doppler ultrasound radar to collect the average velocity of water flow inside the drainage pipeline and the water level at the interface between solid and liquid based on the radius of the drainage pipeline;

S22. Using a high-definition infrared camera to capture image information of the interface between air and water in the drainage pipeline;

S23. Improving the deep curve estimation algorithm by using multi-scale depthwise separable convolutions, which can automatically map low-light images to their normal light, to obtain a weak-light enhancement algorithm based on multi-scale depthwise convolutions, which is then applied in enhancing features of the interface between air and water in drainage pipelines;

S24. Adding a multi-scale convolutional neural network (MCNN) to the backbone network of YOLO v8 and a front-end adaptive genetic algorithm (AGA) to the network detection head of YOLO v8 to obtain an improved target detection algorithm based on AGA and MCNN. The improved target detection algorithm is used to recognize the interface between air and water in drainage pipeline images, identifying the target area of the interface between air and water in images;

S25. Replacing the input and output layers of the U-shaped convolutional neural network algorithm structure with a stacked autoencoder (SAE) structure, to obtain an SAE-guided U-shaped CNN algorithm. When the improved target detection algorithm identifies the interface between air and water in drainage pipeline images, the SAE-guided U-shaped CNN algorithm performs image segmentation of the target area of the interface between air and water, to obtain the dividing line of the interface between them, which together with the pipeline wall and the measured water level constitutes the cross-section of pipeline flow; and S26. Inputting cross-sectional data of pipeline flow into a multi-dimensional classification error adaptive boosting regression algorithm to obtain the cross-sectional area of pipeline flow, multiplying the cross-sectional area of pipeline flow by the average velocity of the measured cross-section of water flow to obtain the measurement of output pipeline flow.

Further, the diagnostic process of the intelligent pipeline sedimentation diagnosis module comprises:

S31. Combining manual inspection of drainage pipelines and UUVs to collect training samples of pipeline inlet and outlet flow with labels indicating pipeline sedimentation;

S32. Using a generative adversarial network to expand the training sample set with labels indicating pipeline sedimentation; and S33. Dividing the training sample set with labels indicating pipeline sedimentation into training and validation sets, constructing an intelligent pipeline sedimentation diagnosis algorithm that integrates GASF, CNNs, bidirectional LSTM neural networks, and attention mechanisms, introducing physical knowledge constraints into the loss function of the intelligent pipeline sedimentation diagnosis algorithm. The physical knowledge constraints are extracted from the hydraulic models of changes in drainage pipeline inlet and outlet flow at different levels of sedimentation. The GASF and CNNs are used to process data of the input sample set; the bidirectional LSTM neural networks are responsible for feature extraction and dimension reduction of blockages; the purpose of the attention mechanisms is to classify results of pipeline sedimentation.

Third, this invention provides a maintenance decision-making method for drainage pipeline-based waterlogging warning, which is applied to the aforementioned UUV, comprising:

S1. Building a rainfall-runoff numerical model of drainage pipeline sedimentation based on the diagnosis results of drainage pipeline sedimentation in the study area output by the drainage pipeline sedimentation diagnosis model, to obtain simulated data about waterlogging;

S2. Using the diagnosis results of drainage pipeline sedimentation in the study area output by the pipeline sedimentation diagnosis model and simulated data about waterlogging to construct training, validation, and test sets of the waterlogging warning model;

S3. Training the waterlogging warning model with the training, validation, and test sets to obtain an optimal waterlogging warning model;

The deep learning algorithm in the waterlogging warning model consists of one-dimensional (1D) and two-dimensional (2D) CNNs, LSTM networks, and attention mechanisms. In the waterlogging warning model, physics-guided deep learning algorithms are embedded, with physical knowledge extracted from the hydrodynamic model of changes in drainage pipeline inlet and outlet flow at different levels of sedimentation and improved coupled 1D and 2D urban surface and underground models;

S4. Using the output of the optimal drainage pipeline sedimentation diagnosis model and the optimal waterlogging warning model to build an optimal pipeline maintenance decision-making model based on multi-objective optimization and waterlogging damage assessment methods. The waterlogging damage assessment methods consist of triangular type-2 fuzzy sets and dynamic proportional substitution methods;

S5. Deploying UUVs at the inlets and outlets of drainage pipelines in the study area. Each UUV deployed at the inlet or outlet of drainage pipelines collects data and uploads the output of the drainage pipeline sedimentation diagnosis model to the server. The server generates a pipeline sedimentation database with the output of the drainage pipeline sedimentation diagnosis model of each UUV deployed at the inlet or outlet of drainage pipelines in the study area; and S6. Selecting UUVs deployed at the inlets and outlets of drainage pipelines closest to the server, and with the generated pipeline sedimentation database as input, using the optimal waterlogging warning model and the optimal pipeline maintenance decision-making model based on multi-objective optimization and waterlogging damage assessment methods, to output waterlogging warning results and optimal decisions, respectively.

Further, the construction process of the waterlogging warning model comprises:

S41. Constructing hydraulic models of drainage pipelines at different levels of sedimentation;

S42. Performing numerical simulations of the hydraulic models of drainage pipelines in a state of sedimentation, calibrating hydraulic parameters related to flow velocity and flow indicators;

S43. Improving 1D and 2D coupled urban surface and underground models from the perspective of horizontal surface connections and vertical surface-underground connections based on constructed hydraulic models of drainage pipelines at different levels of sedimentation;

S44. Using the improved coupled 1D and 2D urban surface and underground models to generate sample sets of different conditions of pipeline sedimentation labeled with waterlogging results;

S45. Constructing a deep learning algorithm combining 1D and 2D CNNs, LSTM networks, and attention mechanisms. The 1D and 2D CNNs are responsible for multi-dimensional and multi-scale feature extraction of inlet and outlet flow data of drainage pipelines. The LSTM networks perform feature fusion and dimension reduction of features extracted by 1D and 2D CNNs over time series. The attention mechanism classifies and outputs the final waterlogging warning results; and S46. Introducing hydraulic models of drainage pipelines at different levels of sedimentation and physical knowledge constraints from the improved 1D and 2D coupled urban surface and underground models into the loss function of the deep learning algorithm combining 1D and 2D CNNs, LSTM networks, and attention mechanisms. Training and calibrating parameters in the model using sample sets of different conditions of pipeline sedimentation labeled with waterlogging results to obtain the waterlogging warning model.

Further, the specific output of optimal decisions comprises:

S51. Introducing triangular type-2 fuzzy sets and dynamic proportional substitution methods, migrating sample data of multiple cities to a loss rate sample matrix of the study area. Combined with the output of the waterlogging warning model, waterlogging damage assessment methods are obtained based on the triangular type-2 fuzzy sets and dynamic proportional substitution methods. The formulaic expression of waterlogging damage rates in the waterlogging damage assessment methods is as follows:

$f(s)=\chi_f e^{(k\sqrt{s}+b)}$, where f(s) is the waterlogging damage rate, s is the corresponding waterlogging depth value, k and b are dynamic proportional substitution parameters, $\chi_f$ represents the main membership function of the triangular type-2 fuzzy set of property density in the study area. Based on historical property density survey data in the study area, drawing the coordinates of the three vertices $((\gamma_1,m^*), (\gamma_2,1), (\gamma_3,n^*))$ of the triangular fuzzy set depicting property density in the study area. With $\alpha$ as the cut-set value, $\xi$ representing the triangular type-2 fuzzy set of property density in the study area, $\xi$ necessity measure $N_{ec}(\xi\geq\alpha)$ and main membership function $\chi_f$ are expressed as:

$$Nec(\xi \geq \alpha) = \begin{cases} 1, & \text{if } 0 \leq \alpha \leq \gamma_1 \\ m^*, & \text{if } \gamma_1 \leq \alpha \leq \gamma_2 \\ 0, & \text{if } \gamma_2 < \alpha \leq 1 \end{cases}, \chi_f = \sup_{\alpha \in [0,1]} \{\alpha \wedge Nec(\xi \geq \alpha)\},$$

where sup denotes the supremum in mathematical operation;

S52. With minimum waterlogging damage caused by blocked drainage pipelines, minimum drainage pipeline maintenance cost, and maximum economic benefits as constraints, with the waterlogging damage assessment methods, constructing an optimal pipeline maintenance decision-making model based on multi-objective optimization and the waterlogging damage assessment methods. The calculation method of waterlogging damage is as follows:

$$\text{Waterlogging damage } x_i = \text{property density } (yuan/m^2) \times$$
$$\text{inundated area } (m^2) \times \text{waterlogging damage rate } (\%);$$

The calculation method of drainage pipeline maintenance cost $y_i$ is as follows:

$y_i$=sedimentation length*sedimentation level*maintenance cost basis*fuzzy coefficient of maintenance cost;

The calculation of maintenance cost fuzzy coefficient $M_{cb}$ uses empirical data of historical maintenance to construct a triangular type-2 fuzzy set $\xi$. Combined with the three vertex coordinates $((\gamma_1,m^*), (\gamma_2,1), (\gamma_3,n^*))$ of the triangular type-2 fuzzy set and the cut-set value $\alpha$, $\xi$'s credibility measure $C_{re}(\xi\geq\alpha)$ and the maintenance cost fuzzy coefficient $M_{cb}$ are expressed as:

$$Cre(\xi \geq \alpha) = \begin{cases} 1, & \text{if } 0 \leq \alpha \leq \gamma_1 \\ \frac{1+m^*}{2}, & \text{if } \gamma_1 < \alpha \leq \gamma_2 \\ \frac{n^*}{2}, & \text{if } \gamma_2 < \alpha \leq \gamma_3 \\ 0, & \text{if } \gamma_3 < \alpha \leq 1 \end{cases}, M_{cb} = \sup_{\alpha \in [0,1]} \{\alpha \wedge Cre(\xi \geq \alpha)\};$$

S53. While ensuring there is no risk to personnel, calculating whether maintenance measures are necessary for the ith segment of drainage pipelines, and defining the objective profit function $$Tar = \sum_{i=1}^{M}(-a_i x_i - b_i y_i),$$

where M represents the total number of drainage pipelines, $\alpha_i$ indicates whether sedimentation has occurred in the $i^{th}$ segment of drainage pipelines, $b_i$ denotes whether maintenance measures are implemented for the $i^{th}$ segment. If yes, then $$\begin{cases} a_i = 0, \\ b_i = 1 \end{cases};$$

if no, then $$\begin{cases} a_i = 1, \\ b_i = 0 \end{cases};$$

and

S54. The constraint is to maximize the target profit function $$\text{Tar} = \sum_{i=1}^{M} (-a_i x_i - b_i y_i)$$

(i.e., max(Tar)), thereby outputting optimal decisions on all pipeline segments within the specified area.

Further, the maintenance decision-making method for drainage pipeline-based waterlogging warning also comprises:

S7. Deploying UUVs at the drainage pipeline inlets and outlets closest to the server to output waterlogging warning results and optimal decisions, and visualizing the sedimentation database of drainage pipelines on the comprehensive decision-making platform for drainage pipelines deployed on the server to achieve an integrated decision-making system for drainage pipelines, which comprises:

By using the Doppler ultrasound module, three-axis gyroscope, high-definition infrared camera, and non-contact liquid level gauge on UUVs, multi-sensor data is acquired, which is transmitted through the wireless communication module and stored on the comprehensive decision-making platform for drainage pipelines. The platform visualizes output from the UUV's drainage pipeline sedimentation diagnosis model, waterlogging warning model, and optimal maintenance decision-making model. Based on a browser/server access control architecture, an integrated drainage pipeline decision-making system comprising UUVs, multi-sensor data, and the comprehensive decision-making platform is developed and deployed. The system enables real-time monitoring of drainage pipelines, diagnosis of pipeline sedimentation, waterlogging warnings, and optimal maintenance decision-making.

Advantageous Effects of this Invention Include

This invention adopts a comprehensive approach based on deep learning networks for diagnosing sedimentation in drainage pipelines, predicting waterlogging, and optimizing maintenance decisions through multi-objective optimization and waterlogging damage assessment methods. It only requires defining the study area and deploying UUV equipment without subsequent human intervention to achieve the entire process of diagnosing sedimentation, warning of waterlogging, and making optimal maintenance decisions for drainage pipelines in the study area, making the process convenient and efficient.

This invention develops and establishes an integrated decision-making system for drainage pipelines, comprising the UUV, multi-sensor data, and the comprehensive decision-making platform for drainage pipelines. This system enables real-time monitoring of drainage pipelines, diagnosis of pipeline sedimentation, early warning of waterlogging, and optimal decision-making for pipeline maintenance.

This invention integrates the hardware structure of the UUV, visualization modules for displaying results, data reception modules for sensor equipment, and intelligent data processing algorithms into a single framework. The development creates a comprehensive decision-making platform for urban drainage pipelines, achieving real-time pipeline monitoring, pipeline sedimentation diagnosis, waterlogging warning, and optimal maintenance decision-making in a fully automated, intelligent, and precise manner.

Figure 1:
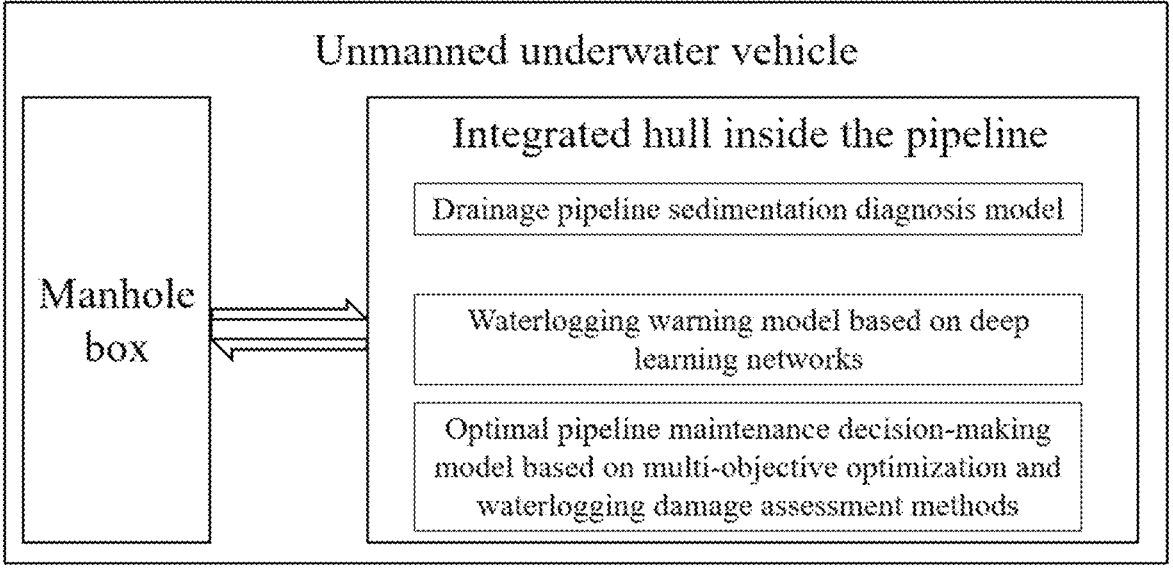
FIG. 1 depicts the structural diagram of the UUV for drainage pipelines proposed by this invention.

The figures include a Doppler ultrasound module 100, a three-axis gyroscope 101, a high-definition infrared camera 102, a navigation interface 103, a deep learning development board 104, a main controller 105, a cabin cover 106, baffles 107, fins 108, towing rings 109, a cabin 110, a floating towing cable 200, a whip-like transmission antenna 201, a non-contact liquid level gauge for pipelines 202, a box 203, fixing claws 204, a wireless communication module 205, a box cover 206, a lithium battery 207, a manhole box 300, and an integrated hull inside the pipeline 301.

MODES FOR CARRYING OUT THE INVENTION

To clarify the objectives, technical solutions, and advantages of the embodiments of this invention, we will provide a detailed and complete description of technical solutions in the embodiments of this invention based on attached drawings therein.

This invention proposes a UUV, as illustrated in FIG. 1, composed of an integrated hull inside the pipeline and a manhole box. The integrated hull inside the pipeline incorporates a pipeline sedimentation diagnosis model based on deep learning networks, a waterlogging warning model, and an optimal pipeline maintenance decision-making model based on multi-objective optimization and waterlogging damage assessment methods. The integrated hull and the manhole box are interconnected via a floating towing cable.

Figure 2:
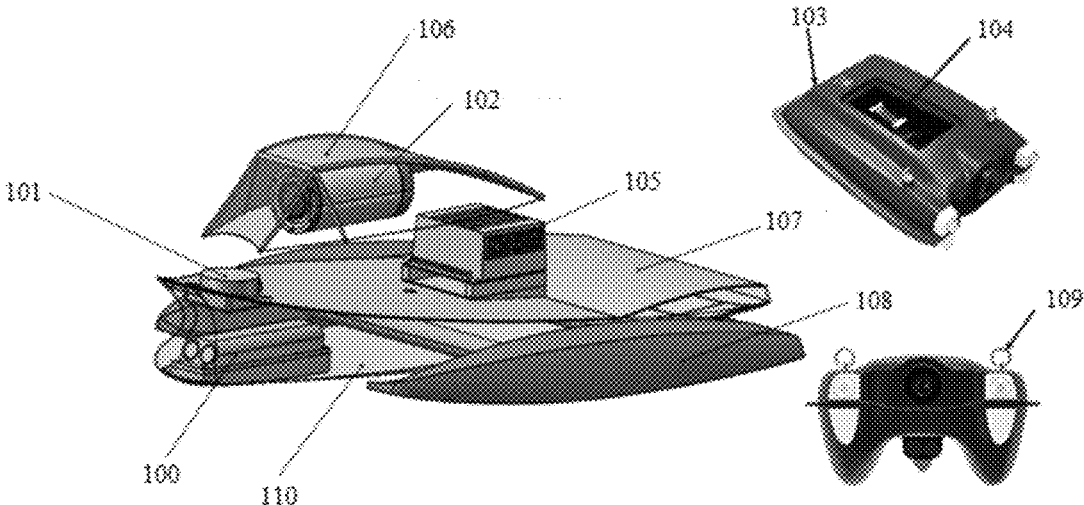
FIG. 2 shows the hardware structure diagram of the integrated hull inside the pipeline proposed by this invention.
Figure 3:
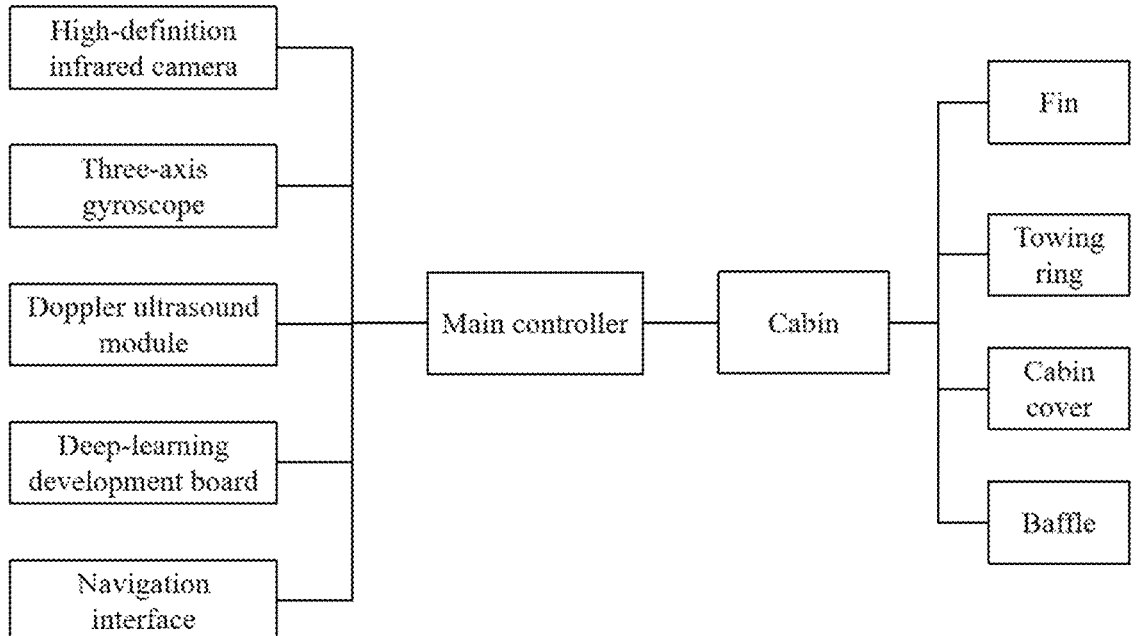
FIG. 3 illustrates the connection diagram between modules within the hardware structure of the integrated hull inside the pipeline proposed by this invention.

In this embodiment, as shown in FIG. 2, the hardware structure of the integrated hull inside the pipeline comprises a Doppler ultrasound module 100, a three-axis gyroscope 101, a high-definition infrared camera 102, a main controller 105, a deep learning development board 104, baffles 107, a cabin cover 106, a cabin 110, fins 108, towing rings 109, and a navigation interface 103. Their interconnections are depicted in FIG. 3: the Doppler ultrasound module 100, three-axis gyroscope 101, high-definition infrared camera 102, navigation interface 103, and deep learning development board 104 are connected to the main controller 105, all integrated within the cabin 110; and fins 108, towing rings 109, cabin cover 106, and baffles 107 are connected to the cabin 110.

Figure 4:
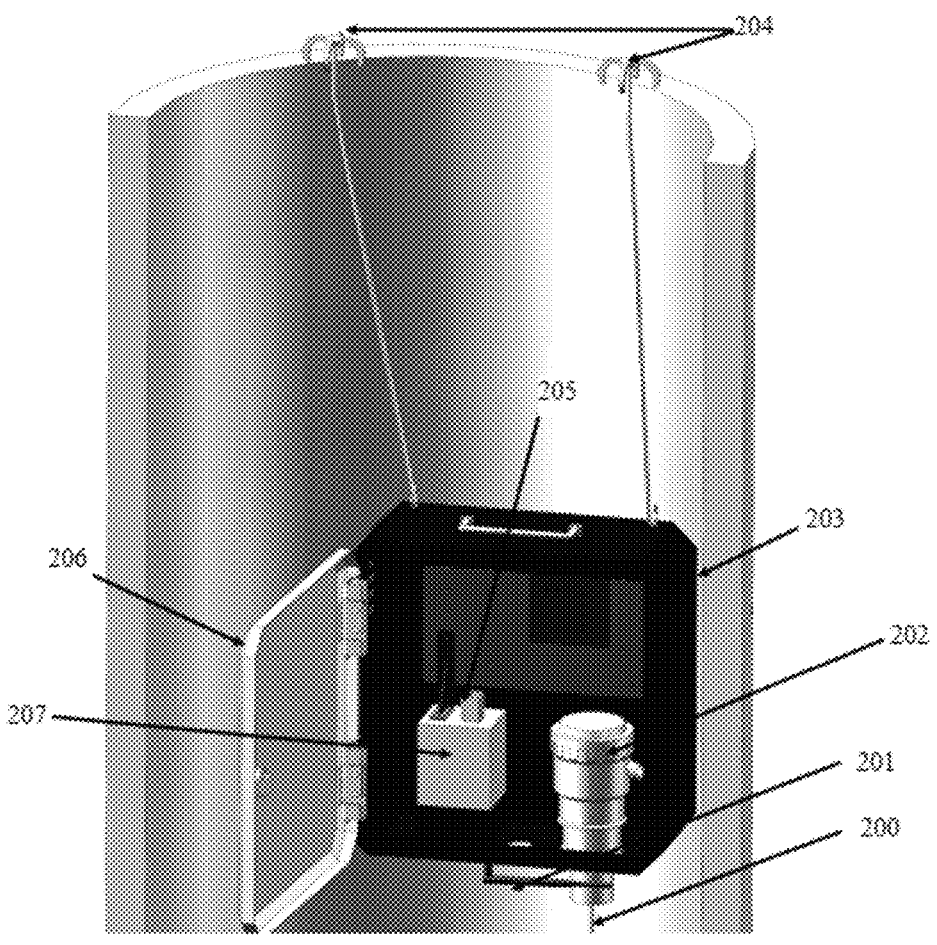
FIG. 4 displays the hardware structure diagram of the manhole box proposed by this invention.
Figure 5:
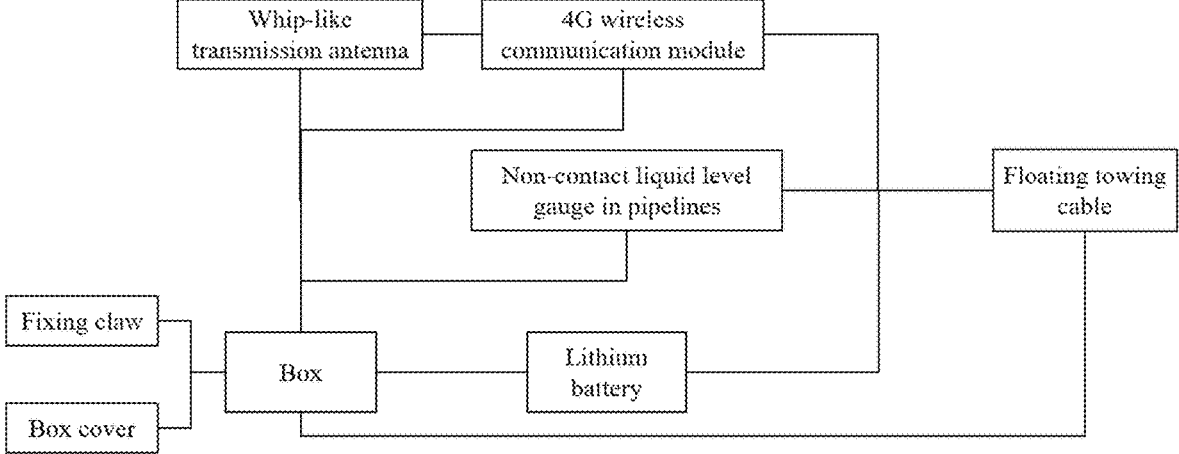
FIG. 5 presents the connection diagram between modules within the hardware structure of the manhole box proposed by this invention.

In this embodiment, as shown in FIG. 4, the hardware structure of the manhole box includes a floating towing cable 200, a lithium battery 207, a non-contact liquid level gauge 202 for pipelines, a wireless communication module 205, a whip-like transmission antenna 201, a box 203, a box cover 206, and fixing claws 204. FIG. 5 shows their connections: The whip-like transmission antenna 201 is connected to the wireless communication module 205 to implement wireless data upload and download functions; the fixing claws 204 and box cover 206 are connected to the box 203; the floating towing cable 200, lithium battery 207, wireless communication module 205, non-contact liquid level gauge 202 for pipelines, and whip-like transmission antenna 201 are all securely installed within the box 203; the non-contact liquid level gauge 202 for pipelines, lithium battery 207, and wireless communication module 205 are connected to the floating towing cable 200.

Figure 6:
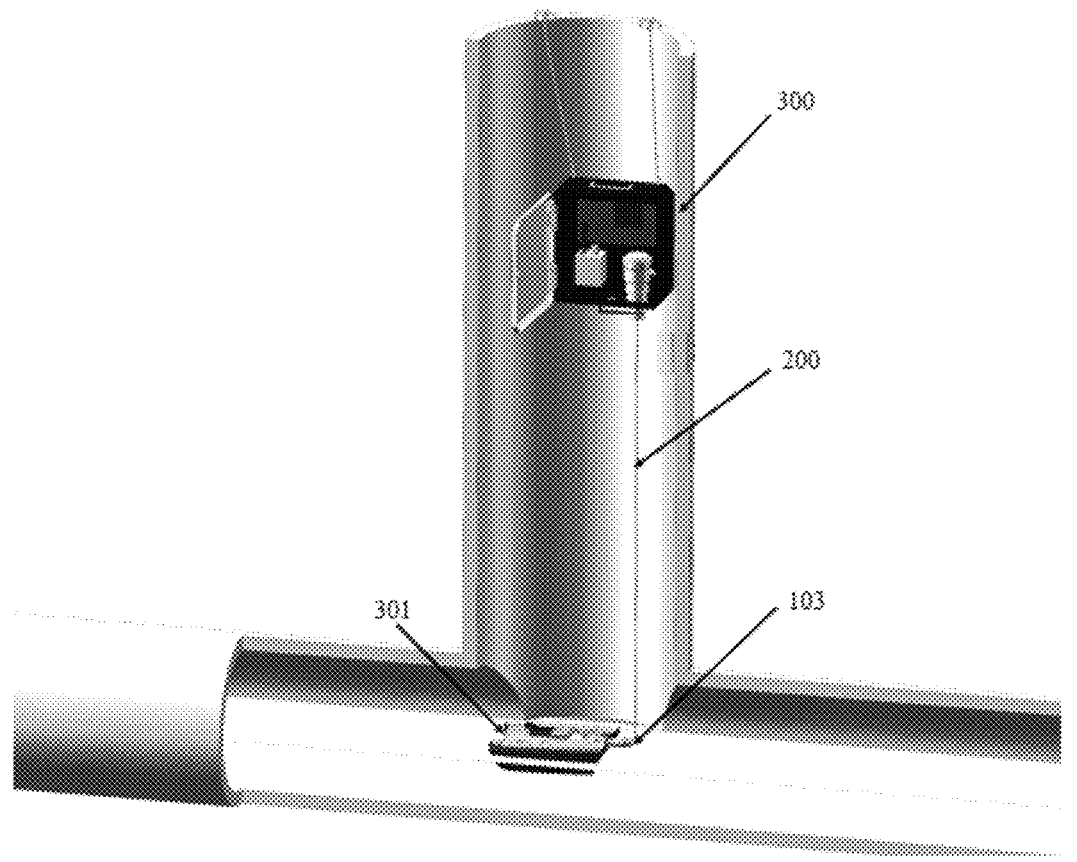
FIG. 6 outlines the connection relationship diagram between the integrated hull inside the pipeline and the manhole box proposed by this invention.
Figure 7:
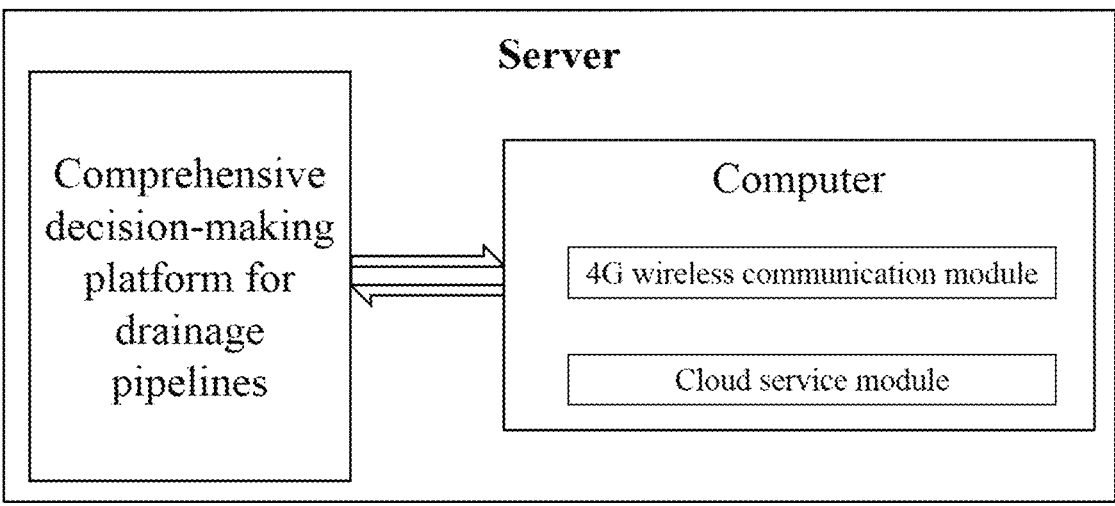
FIG. 7 illustrates the structural diagram of the server proposed by this invention.

As shown in FIG. 6, the integrated hull inside pipeline 301 and the manhole box 300 are respectively fixed at the bottom and middle part of the manhole chamber. The floating towing cable 200 is connected to the navigation interface 103 of the integrated hull inside the pipeline, enabling data exchange between the manhole box 300 and the integrated hull inside pipeline 301.

The following section provides a detailed description of the method implemented by the UUV of this invention.

This invention provides a method for diagnosing drainage pipeline sedimentation, applied to the aforementioned UUV, comprising:

S1. Screening infrared images of drainage pipeline inlets and outlets captured by the UUV. The criteria for screening images require that the internal walls on both sides horizontally in the drainage pipeline are displayed within the image frame, with the interface between air and water clear. The images include light intensity, noise intensity, and factors causing missing points in the capture, and must be taken from multiple shooting angles;

S2. Using image annotation tools to annotate the screened infrared images to obtain infrared images of drainage pipeline inlets and outlets with annotated interfaces between air and water;

S3. Based on the infrared images of drainage pipeline inlets and outlets with annotated interfaces between air and water, combined with pre-measured Doppler ultrasound data and data about the inlet and outlet flow volume and sedimentation of drainage pipelines, constructing training, validation, and test sets for the sedimentation diagnosis model of drainage pipelines; and S4. Training the drainage pipeline sedimentation diagnosis model by using its training, validation, and test sets. Tuning hyperparameters involve decoupled weight decay magnitude, batch size, maximum iterations, learning rates, and momentum coefficients. After completion of training, the optimal drainage pipeline sedimentation diagnosis model is obtained and the diagnosis results of sedimentation in the drainage pipelines in the study area are output;

The deep learning algorithm in the drainage pipeline sedimentation diagnosis model consists of GASF, CNNs, bidirectional LSTM neural networks, and attention mechanisms. Physics-guided deep learning algorithms are embedded in the pipeline sedimentation diagnosis model, and such physics is extracted from the hydraulic models of changes in drainage pipeline inlet and outlet flow at different levels of sedimentation;

In an embodiment of this invention, the drainage pipeline sedimentation diagnosis model comprises an intelligent pipeline flow measurement module and an intelligent pipeline sedimentation diagnosis module.

The measurement process of the intelligent pipeline flow measurement module comprises:

S21. Using Doppler ultrasound radar to collect the average velocity of water flow inside the drainage pipeline and the water level at the interface between solid and liquid based on the radius of the drainage pipeline;

S22. Using a high-definition infrared camera to capture image information of the interface between air and water in the drainage pipeline;

S23. Improving the deep curve estimation algorithm by using $1\times3$, $3\times1$, $5\times1$ and $1\times5$ multi-scale depthwise separable convolutions, which can automatically map low-light images to their normal light, to obtain a weak-light enhancement algorithm based on multi-scale depthwise convolutions, which is then applied in enhancing features of the interface between air and water in drainage pipelines;

S24. Adding a $1\times3$, $7\times1$, $5\times1$, and $1\times7$ multi-scale convolutional neural network (MCNN) to the backbone network of YOLO v8 to improve its feature extract accuracy, and a front-end adaptive genetic algorithm (AGA) to the network detection head of YOLO v8 to obtain an improved target detection algorithm based on AGA and MCNN. The improved target detection algorithm is used to recognize the interface between air and water in drainage pipeline images, identifying the target area of the interface between air and water in images;

S25. Replacing the input and output layers of the U-shaped CNN algorithm structure with a stacked autoencoder (SAE) structure, to obtain an SAE-guided U-shaped CNN algorithm. When the improved target detection algorithm identifies the interface between air and water in drainage pipeline images, the SAE-guided U-shaped CNN algorithm performs image segmentation of the target area of the interface between air and water, to obtain the dividing line of the interface between them, which together with the pipeline wall and the measured water level constitutes the cross-section of pipeline flow; and S26. Inputting cross-sectional data of pipeline flow into a multi-dimensional classification error adaptive boosting regression algorithm to obtain the cross-sectional area of pipeline flow, multiplying the cross-sectional area of pipeline flow by the average velocity of the measured cross-section of water flow to obtain the measurement of output pipeline flow.

In an embodiment of this invention, the diagnostic process of the intelligent pipeline sedimentation diagnosis module includes:

S31. Combining manual inspection of drainage pipelines and UUVs to collect training samples of pipeline inlet and outlet flow with labels indicating pipeline sedimentation;

S32. Building hydraulic models of changes in drainage pipeline inlet and outlet flow at different levels of sedimentation, and using generative adversarial networks to expand the training sample set with labels indicating pipeline sedimentation; and S33. Dividing the training sample set with labels indicating pipeline sedimentation into training and validation sets at a ratio of 4:1, constructing an intelligent pipeline sedimentation diagnosis algorithm that integrates GASF, CNNs, bidirectional LSTM neural networks, and attention mechanisms, introducing physical knowledge constraints into the loss function of the intelligent pipeline sedimentation diagnosis algorithm. The physical knowledge constraints are extracted from the hydraulic models of changes in drainage pipeline inlet and outlet flow at different levels of sedimentation. The GASF and CNNs are used to process data of the input sample set; the bidirectional LSTM neural network is responsible for feature extraction and dimension reduction of blockages; the purpose of the attention mechanism is to classify results of pipeline sedimentation.

This invention provides a drainage pipeline-based waterlogging warning method, which is applied to the aforementioned UUV, comprising:

S1. Building a rainfall-runoff numerical model of drainage pipeline sedimentation based on the diagnosis results of drainage pipeline sedimentation in the study area output by the drainage pipeline sedimentation diagnosis model, to obtain simulated data about waterlogging;

S2. Using the diagnosis results of drainage pipeline sedimentation in the study area output by the pipeline sedimentation diagnosis model and simulated data about waterlogging to construct training, validation, and test sets of the waterlogging warning model at a ratio of 4:3:3;

S3. Training the waterlogging warning model with the training, validation, and test sets to obtain an optimal waterlogging warning model;

The deep learning algorithm in the waterlogging warning model consists of 1D and 2D CNNs, LSTM networks, and attention mechanisms. In the waterlogging warning model, physics-guided deep learning algorithms are embedded, with physical knowledge extracted from the hydrodynamic model of changes in drainage pipeline inlet and outlet flow at different levels of sedimentation and improved coupled 1D and 2D urban surface and underground models;

S4. Using the output of the optimal drainage pipeline sedimentation diagnosis model and the optimal waterlogging warning model to build an optimal pipeline maintenance decision-making model based on multi-objective optimization and waterlogging damage assessment methods. The waterlogging damage assessment methods consist of triangular type-2 fuzzy sets and dynamic proportional substitution methods;

S5. Deploying UUVs at the inlets and outlets of drainage pipelines in the study area. Each UUV deployed at the inlet or outlet of drainage pipelines collects data and uploads the output of the drainage pipeline sedimentation diagnosis model to the server. The server generates a pipeline sedimentation database with the output of the drainage pipeline sedimentation diagnosis model of each UUV deployed at the inlet or outlet of drainage pipelines in the study area;

S6. Selecting UUVs deployed at the inlets and outlets of drainage pipelines closest to the server, and with the generated pipeline sedimentation database as input, using the optimal waterlogging warning model and the optimal pipeline maintenance decision-making model based on multi-objective optimization and waterlogging damage assessment methods, to output waterlogging warning results and optimal decisions, respectively; and S7. Deploying UUVs at the drainage pipeline inlets and outlets closest to the server to output waterlogging warning results and optimal decisions, and visualizing the sedimentation database of drainage pipelines on the comprehensive decision-making platform for drainage pipelines deployed on the server to achieve an integrated decision-making system for drainage pipelines, which comprises:

By using the Doppler ultrasound module, three-axis gyroscope, high-definition infrared camera, and non-contact liquid level gauge on UUVs, multi-sensor data is acquired, which is transmitted through the wireless communication module and stored on the comprehensive decision-making platform for drainage pipelines. The platform visualizes output from the UUV's drainage pipeline sedimentation diagnosis model, waterlogging warning model, and optimal maintenance decision-making model. Based on a browser/server access control architecture, an integrated drainage pipeline decision-making system comprising UUVs, multi-sensor data, and the comprehensive decision-making platform is developed and deployed. The system enables real-time monitoring of drainage pipelines, diagnosis of pipeline sedimentation, waterlogging warnings, and optimal maintenance decision-making.

In an embodiment of this invention, the construction process of the waterlogging warning model includes:

S41. Constructing hydraulic models of drainage pipelines at different levels of sedimentation based on the software Infoworks ICM;

S42. Performing numerical simulations of the hydraulic models of drainage pipelines in a state of sedimentation with the software Fluent, calibrating hydraulic parameters related to flow velocity and flow indicators;

S43. Improving 1D and 2D coupled urban surface and underground models from the perspective of horizontal surface connections and vertical surface-underground connections based on constructed hydraulic models of drainage pipelines at different levels of sedimentation;

S44. Using the improved coupled 1D and 2D urban surface and underground models to generate sample sets of different conditions of pipeline sedimentation labeled with waterlogging results;

S45. Constructing a deep learning algorithm combining 1D and 2D CNNs, LSTM networks, and attention mechanisms. The 1D and 2D CNNs are responsible for multi-dimensional and multi-scale feature extraction of inlet and outlet flow data of drainage pipelines. The LSTM networks perform feature fusion and dimension reduction of features extracted by 1D and 2D CNNs over time series. The attention mechanism classifies and outputs the final waterlogging warning results; and S46. Introducing hydraulic models of drainage pipelines at different levels of sedimentation and physical knowledge constraints from the improved 1D and 2D coupled urban surface and underground models into the loss function of the deep learning algorithm combining 1D and 2D CNNs, LSTM networks, and attention mechanisms. Training and calibrating parameters in the model using sample sets of different conditions of pipeline sedimentation labeled with waterlogging results to obtain the waterlogging warning model.

In an embodiment of this invention, the specific output of optimal decision results includes:

S51. Introducing triangular type-2 fuzzy sets and dynamic proportional substitution methods, migrating sample data of multiple cities to a loss rate sample matrix of the study area. Combined with the output of the waterlogging warning model, an waterlogging damage assessment method is obtained based on the triangular type-2 fuzzy sets and dynamic proportional substitution methods. The formulaic expression of waterlogging damage rates in the waterlogging damage assessment method is as follows:

$f(s)=\chi_f e^{(k\sqrt{s}+b)}$, where $f(s)$ is the waterlogging damage rate, $s$ is the corresponding waterlogging depth value, $k$ and $b$ are dynamic proportional substitution parameters, $\chi_f$ represents the main membership function of the triangular type-2 fuzzy set of property density in the study area. Based on historical property density survey data in the study area, drawing the coordinates of the three vertices $((\gamma_1, m^*), (\gamma_2, 1), (\gamma_3, n^*))$ of the triangular fuzzy set depicting property density in the study area. With $\alpha$ as the cut-set value, $\xi$ representing the triangular type-2 fuzzy set of property density in the study area, $\xi\xi$ necessity measure $N_{ec}(\xi\geq\alpha)$ and main membership function $\chi_f$ are expressed as:

$$Nec(\xi \geq \alpha) = \begin{cases} 1, \text{ if } 0 \leq \alpha \leq \gamma_1 \\ m^*, \text{ if } \gamma_1 < \alpha \leq \gamma_2, \chi_f = sup\{\alpha \wedge Nec(\xi \geq \alpha)\}, \\ 0, \text{ if } \gamma_2 < \alpha \leq 1 \end{cases}$$

where sup denotes the supremum in mathematical operation;

S52. With minimum waterlogging damage caused by blocked drainage pipelines, minimum drainage pipeline maintenance cost, and maximum economic benefits as constraints, with the waterlogging damage assessment method, constructing an optimal pipeline maintenance decision-making model based on multi-objective optimization and the waterlogging damage assessment method. The calculation method of waterlogging damage is as follows:

Waterlogging damage $x_i$ = property density $(yuan/m^2) \times$ inundated area $(m^2) \times$ waterlogging damage rate (%);

The calculation method of drainage pipeline maintenance cost $y_i$ is as follows:

$y_i$=sedimentation length*sedimentation level*maintenance cost basis*fuzzy coefficient of maintenance cost;

The calculation of maintenance cost fuzzy coefficient $M_{cb}$ uses empirical data of historical maintenance to construct a triangular type-2 fuzzy set $\xi$. Combined with the three vertex coordinates $((\gamma_1, m^*), (\gamma_2, 1), (\gamma_3, n^*))$ of the triangular type-2 fuzzy set and the cut-set value $\alpha$, $\xi$'s credibility measure $C_{re}(\xi\geq\alpha)$ and the maintenance cost fuzzy coefficient $M_{cb}$ are expressed as:

$$Cre(\xi \geq \alpha) = \begin{cases} 1, & \text{if } 0 \leq \alpha \leq \gamma_1 \\ \dfrac{1+m^*}{2}, & \text{if } \gamma_1 < \alpha \leq \gamma_2 \\ \dfrac{n^*}{2}, & \text{if } \gamma_2 < \alpha \leq \gamma_3 \\ 0, & \text{if } \gamma_3 < \alpha \leq 1 \end{cases}, M_{cb} = \sup_{\alpha \in [0,1]} \{\alpha \wedge Cre(\xi \geq \alpha)\};$$

S53. While ensuring there is no risk to personnel, calculating whether maintenance measures are necessary for the $i^{th}$ segment of drainage pipelines, and defining the objective profit function $$Tar = \sum_{i=1}^{M}(-a_i x_i - b_i y_i),$$

where M represents the total number of drainage pipelines, $a_i$ indicates whether sedimentation has occurred in the $i^{th}$ segment of drainage pipelines, $b_i$ denotes whether maintenance measures are implemented for the $i^{th}$ segment. If yes, then $$\begin{cases} a_i = 0 \\ b_i = 1 \end{cases};$$

if no, then $$\begin{cases} a_i = 1 \\ b_i = 0 \end{cases};$$

and

S54. The constraint is to maximize the target profit function $$Tar = \sum_{i=1}^{M}(-a_i x_i - b_i y_i)$$

(i.e., max(Tar)), thereby outputting optimal decisions on all pipeline segments within the specified area.

The functional parameters of the UUV's hardware and software structure for this invention are listed in Table 1.

TABLE 1

| Structural parameters of the UUV's hardware and software structure for this invention | |
| --- | --- |
| Indicator | Parameter |
| Drainage pipeline flow measurement range: | −8 m/s to +8 m/s |
| Drainage pipeline flow measurement frequency | The default measurement frequency for drainage pipeline flow is once every 30 seconds, and this can be changed wirelessly via the console software. |

TABLE 1-continued

| Structural parameters of the UUV's hardware and software structure for this invention | |
|---|---|
| Indicator | Parameter |
| Drainage pipeline flow measurement accuracy | 93.7% |
| Drainage pipeline flow measurement precision | 97% ± 1% |
| Drainage pipeline velocity measurement precision | 0.03 m/s |
| Direction precision of the three-axis gyroscope | 0.2 degree |
| Attitude precision of the three-axis gyroscope | 0.1 degree |
| Minimum velocity recognition resolution: | 0.8 mm/s |
| Operating temperature | −10° C. to 50° C. |
| Overall hardware structure dimensions | 420 mm × 380 mm × 112 mm |
| Communication frequency | Once/min |
| Maximum CPU frequency of the deep learning development board | 2.2 GHz |
| Lifespan of the UUV | Over 10 years in normal drainage pipeline conditions |
| The IP rating of the equipment structure | High waterproof grade |
| Indicator collection status | Flow cross-section images, sediment heights of measured points, instantaneous velocity, time points, and navigation location of equipment |
| Output results | Instantaneous velocity/flow, sedimentation status, length and thickness, waterlogging and maintenance decisions, current equipment location |
| Wireless communication module | Implementing a wireless communication module in the comprehensive decision-making platform for drainage pipelines allows for wireless data exchange. |
| Controller | Equipped with an integrated clock chip for precise time-stamping of measurement data |
| Power supply mode | Default operation on rechargeable lithium batteries, providing over 18 months of usage on a single charge. |
| Data storage | Built-in storage of 2 TB, capable of storing collected data and output results for over 5 years |
| Installation and maintenance | Designed for easy deployment with a drag-and-drop mechanism, eliminating the need for manual entry into the well for installation and debugging. |

The functional parameters of the comprehensive decision-making platform for drainage pipelines of this invention are detailed in Table 2.

| Indicator | Parameter |
|---|---|
| Data access method | Data is accessed and managed through a database. |
| Platform communication mode | The platform communicates with the UUV via 4G wireless communication modules. |
| Platform response time | 8 s |
| Count of concurrent nodes | The platform can simultaneously monitor over 8000 nodes. |
| Power supply mode | The comprehensive decision-making platform for drainage pipelines is deployed on a server, powered via a wired connection. |
| RAM | 64 GB |
| Data storage space | A storage capacity of 30 TB, capable of storing collected data and output results for over 10 years |
| User logins | The software uses a browser/server architecture, supporting over 60 simultaneous user logins. |
| Applicable platform type | Accessible via computer terminals, as well as mobile devices such as cellphones and tablets |
| Installation and maintenance | The software platform is developed in Python, making it easy to manage and maintain. |

With the underground drainage network and the surface waterlogging early warning system at the waterlogging test field of Huizhou University for example, it is described in detail below. A statistical analysis was conducted on 200 sets of underground drainage pipeline entrances and exits cumulatively. This included actual values of flow, pipeline sedimentation conditions (whether sedimented, sediment length, sediment height), and waterlogging scenarios (depth and extent of inundation). These real values were compared with the UUV-based maintenance decision-making method for drainage pipeline sedimentation diagnosis and waterlogging warning proposed by this invention. Performance indicators are detailed in Table 3.

TABLE 3

| Performance indicators of the implemented algorithm in the example | | | |
|---|---|---|---|
| Parameter | Mean absolute error | Root mean square error | Pearson correlation coefficient |
| Drainage pipeline inlet and outlet flow | 0.028 | 0.231 | 0.953 |
| Drainage pipeline sedimentation diagnosis | 0.019 | 0.152 | 0.975 |
| Waterlogging warning | 0.046 | 0.301 | 0.936 |

In summary, this invention achieves the following performance: In terms of flow measurement, the mean absolute error, root mean square error, and Pearson correlation coefficient are 0.028, 0.231, and 0.953, respectively. For sedimentation diagnosis, their corresponding values are 0.019, 0.152, and 0.975. Regarding early warning for waterlogging, their values are 0.046, 0.301, and 0.936. These results indicate that the UUV equipped with deep learning algorithms offers high precision and reliability, and facilitates highly accurate and intelligent maintenance decision-making for drainage networks.

The above descriptions represent the preferred modes for carrying out the invention. It should be understood that this invention is not limited to the forms disclosed herein and should not be construed as excluding other examples. This invention can be applied to various other combinations, modifications, and environments within the scope of the concepts described herein, with adjustments made based on the instruction provided or the knowledge in relevant fields. Modifications and variations made by those skilled in the art, which remain within the spirit and scope of the invention, are encompassed by the claims attached to the present invention.

What is claimed:

1. An unmanned vessel characterized in that the unmanned vessel is consisted of an integrated vessel body inside a pipeline and a manhole box; the integrated vessel body inside the pipeline comprises a Doppler ultrasound module, a three-axis gyroscope, high-definition infrared cameras, a main controller, a deep learning development board, baffles, a cabin cover, a cabin, fins, towing rings, and a navigation interface; the Doppler ultrasound module, the three-axis gyroscope, the high-definition infrared cameras, the navigation interface, and the deep learning development board are each connected to the main controller; the fins, the towing rings, the cabin cover, and the baffles are connected to the cabin; the main controller is set on the cabin, and the deep learning development board is loaded with a sedimentation diagnosis model for drainage pipelines, a waterlogging warning model, and an optimized maintenance decision-making model based on multi-objective optimization and waterlogging damage assessment methods;

the manhole box comprises a floating towing cable, lithium batteries, a non-contact liquid level gauge for pipelines, a wireless communication module, whip-like transmitting antennas, a box body, a box cover, and fixing claws; the floating towing cable, the lithium batteries, the wireless communication module, the non-contact liquid level gauge for pipelines, and the whip-like transmitting antennas are all fixed inside the box body; the whip-like transmitting antennas are connected to the wireless communication module; the fixing claws and the box cover are connected to the box body; the non-contact liquid level gauge for pipelines, the lithium batteries, and the wireless communication module which is connected to an external server) are connected to the floating towing cable linked with the navigation interface;

wherein, a deep learning algorithm in the drainage pipeline sedimentation disease diagnosis model is consisted of Gramian Angular Summation Field, convolutional neural networks, bidirectional long short-term memory neural networks, and attention mechanisms; physics knowledge-guided deep learning algorithms are embedded in the pipeline sedimentation disease diagnosis model, and the physics knowledge is extracted from a hydraulic models of changes in drainage pipeline inlet and outlet flow at different levels of sedimentation;

wherein, the optimized maintenance decision-making model based on multi-objective optimization and waterlogging damage assessment methods comprises:

screening infrared images of drainage pipeline inlets and outlets captured by the unmanned vessel under the criteria for screening images, which require that the internal walls on both sides horizontally in the drainage pipeline are displayed within the image frame, with the interface between air and water clear; the images comprises light intensity, noise intensity, and factors causing missing points in the capture, and must be taken from multiple shooting angles;

by using image annotation tools to annotate the screened infrared images, obtaining infrared images of drainage pipeline inlets and outlets with annotated interfaces between air and water;

based on the infrared images of drainage pipeline inlets and outlets with annotated interfaces between air and water, combining pre-measured Doppler ultrasound data and data about the inlet and outlet flow and sedimentation of drainage pipelines, and constructing training, validation, and test sets for the pipeline sedimentation diagnosis model; and training the drainage pipeline sedimentation diagnosis model by using its training, validation, and test sets, wherein tuning hyperparameters involve decoupled weight decay magnitude, batch size, maximum iterations, learning rates, and momentum coefficients; after completion of training, obtaining the optimal drainage pipeline sedimentation diagnosis model and outputting the diagnosis results of sedimentation in the drainage pipelines in a study area;

wherein, a deep learning algorithm in the drainage pipeline sedimentation disease diagnosis model is consisted of Gramian Angular Summation Field, convolutional neural networks, bidirectional long short-term memory neural networks, and attention mechanisms; physics knowledge-guided deep learning algorithms are embedded in the pipeline sedimentation disease diagnosis model, and the physics knowledge is extracted from a hydraulic models of changes in drainage pipeline inlet and outlet flow at different levels of sedimentation;

based on diagnosis results of drainage pipeline sedimentation diseases in a study area output by a drainage pipeline sedimentation disease diagnosis model, building a rainfall-runoff numerical model of drainage pipeline sedimentation to obtain simulated data about waterlogging;

constructing training, validation, and test sets of the waterlogging warning model by using the diagnosis results of drainage pipeline sedimentation diseases in a study area output by a drainage pipeline sedimentation disease diagnosis model and the simulated data about waterlogging;

by training the waterlogging warning model with the training, validation, and test sets, obtaining an optimal waterlogging warning model;

wherein, a deep learning algorithm in the waterlogging warning model is consisted of one-dimensional and two-dimensional convolutional neural networks, long short-term memory networks, and attention mechanisms, physics knowledge-guided deep learning algorithms are embedded in the waterlogging warning model, and the physical knowledge is extracted from a hydraulic model of changes in drainage pipeline inlet and outlet flow at different levels of sedimentation and improved coupled one-dimensional and two-dimensional urban surface and underground connection models;

by using the outputs of the optimal drainage pipeline sedimentation disease diagnosis model and the optimal waterlogging warning model, building an optimal pipeline maintenance decision-making model based on multi-objective optimization and waterlogging damage assessment methods consisted of triangular type-2 fuzzy sets and dynamic proportional substitution methods;

when deploying the unmanned surface vehicles at inlets and outlets of drainage pipelines in a study area, collecting data and uploading an output of the drainage pipeline sedimentation disease diagnosis model to the external server by each of the unmanned surface vehicle deployed at the inlet or outlet of drainage pipelines, and generating a pipeline sedimentation database by the external server from the output of the drainage pipeline sedimentation disease diagnosis model of each of the unmanned surface vehicle deployed at the inlet or outlet of drainage pipelines in a study area; and by selected unmanned surface vehicles deployed at the inlets and outlets of drainage pipelines closest to the server, from the generated pipeline sedimentation database as an input, outputting waterlogging warning results and optimal decisions respectively by using the optimal waterlogging warning model and the optimal pipeline maintenance decision-making model based on multi-objective optimization and waterlogging damage assessment methods.

2. The method for diagnosing sedimentation in drainage pipelines, applied to the unmanned vessel as described in claim 1, comprising:

screening infrared images of drainage pipeline inlets and outlets captured by the unmanned vessel under the criteria for screening images, which require that the internal walls on both sides horizontally in the drainage pipeline are displayed within the image frame, with the interface between air and water clear; the images comprises light intensity, noise intensity, and factors causing missing points in the capture, and must be taken from multiple shooting angles;

by using image annotation tools to annotate the screened infrared images obtaining infrared images of drainage pipeline inlets and outlets with annotated interfaces between air and water;

based on the infrared images of drainage pipeline inlets and outlets with annotated interfaces between air and water, combining pre-measured Doppler ultrasound data and data about the inlet and outlet flow and sedimentation of drainage pipelines, and constructing training, validation, and test sets for the pipeline sedimentation diagnosis model; and training the drainage pipeline sedimentation diagnosis model by using its training, validation, and test sets, wherein tuning hyperparameters involve decoupled weight decay magnitude, batch size, maximum iterations, learning rates, and momentum coefficients; after completion of training, obtaining the optimal drainage pipeline sedimentation diagnosis model and outputting the diagnosis results of sedimentation in the drainage pipelines in a study area;

wherein, a deep learning algorithm in the drainage pipeline sedimentation disease diagnosis model is consisted of Gramian Angular Summation Field, convolutional neural networks, bidirectional long short-term memory neural networks, and attention mechanisms; physics knowledge-guided deep learning algorithms are embedded in the pipeline sedimentation disease diagnosis model, and the physics knowledge is extracted from a hydraulic models of changes in drainage pipeline inlet and outlet flow at different levels of sedimentation;

based on diagnosis results of drainage pipeline sedimentation diseases in a study area output by a drainage pipeline sedimentation disease diagnosis model, building a rainfall-runoff numerical model of drainage pipeline sedimentation to obtain simulated data about waterlogging;

constructing training, validation, and test sets of the waterlogging warning model by using the diagnosis results of drainage pipeline sedimentation diseases in a study area output by a drainage pipeline sedimentation disease diagnosis model and the simulated data about waterlogging;

by training the waterlogging warning model with the training, validation, and test sets, obtaining an optimal waterlogging warning model;

wherein, a deep learning algorithm in the waterlogging warning model is consisted of one-dimensional and two-dimensional convolutional neural networks, long short-term memory networks, and attention mechanisms, physics knowledge-guided deep learning algorithms are embedded in the waterlogging warning model, and the physical knowledge is extracted from a hydraulic model of changes in drainage pipeline inlet and outlet flow at different levels of sedimentation and improved coupled one-dimensional and two-dimensional urban surface and underground connection models;

by using the outputs of the optimal drainage pipeline sedimentation disease diagnosis model and the optimal waterlogging warning model, building an optimal pipeline maintenance decision-making model based on multi-objective optimization and waterlogging damage assessment methods consisted of triangular type-2 fuzzy sets and dynamic proportional substitution methods;

when deploying the unmanned surface vehicles at inlets and outlets of drainage pipelines in a study area, collecting data and uploading an output of the drainage pipeline sedimentation disease diagnosis model to the external server by each of the unmanned surface vehicle deployed at the inlet or outlet of drainage pipelines, and generating a pipeline sedimentation database by the external server from the output of the drainage pipeline sedimentation disease diagnosis model of each of the unmanned surface vehicle deployed at the inlet or outlet of drainage pipelines in a study area; and by selected unmanned surface vehicles deployed at the inlets and outlets of drainage pipelines closest to the server, from the generated pipeline sedimentation database as an input, outputting waterlogging warning results and optimal decisions respectively by using the optimal waterlogging warning model and the optimal pipeline maintenance decision-making model based on multi-objective optimization and waterlogging damage assessment methods.

3. According to the method for diagnosing sedimentation in drainage pipelines in claim 2 characterized in that the drainage pipeline sedimentation diagnosis model is composed of an intelligent pipeline flow measurement module and an intelligent pipeline sedimentation diagnosis module;

the measurement process of the intelligent pipeline flow measurement module comprises:

using Doppler ultrasound radar to collect an average velocity of water flow inside the drainage pipeline and the water level at an interface between solid and liquid based on a radius of the drainage pipeline;

using a high-definition infrared camera to capture image information of an interface between air and water in the drainage pipeline;

improving a deep curve estimation algorithm by using multi-scale depthwise separable convolutions, which can automatically map low-light images to their normal light, to obtain a weak-light enhancement algorithm based on multi-scale depthwise convolutions, which is then applied in enhancing features of the interface between air and water in drainage pipelines;

adding a multi-scale convolutional neural network (MCNN) to a backbone network of You Only Look Once version 8 and a front-end adaptive genetic algorithm (AGA) to a network detection head of You Only Look Once version 8 to obtain an improved target detection algorithm based on AGA and MCNN, wherein the improved target detection algorithm is used to recognize the interface between air and water in drainage pipeline images, identifying a target area of the interface between air and water in images;

replacing input and output layers of a U-shaped convolutional neural network algorithm structure with a stacked autoencoder (SAE) structure, to obtain an SAE-guided U-shaped convolutional neural network (CNN) algorithm; when the improved target detection algorithm identifies the interface between air and water in drainage pipeline images, the SAE-guided U-shaped CNN algorithm performs image segmentation of the target area of the interface between air and water, to obtain a dividing line of the interface between them, which together with the pipeline wall and the measured water level constitutes a cross-section of pipeline flow; and inputting cross-sectional data of pipeline flow into a multi-dimensional classification error adaptive boosting regression algorithm to obtain a cross-sectional area of pipeline flow, multiplying the cross-sectional area of pipeline flow by the average velocity of the measured cross-section of water flow to obtain measurement of output pipeline flow.

4. According to the method for diagnosing sedimentation in drainage pipelines in claim 3 characterized by a diagnosis process of the intelligent pipeline sedimentation diagnosis module, which comprises:

combining manual inspection of drainage pipelines and unmanned underwater vehicles (UUVs) to collect training samples of pipeline inlet and outlet flow with labels indicating pipeline sedimentation;

using a generative adversarial network to expand the training sample sets with labels indicating pipeline sedimentation; and dividing the training sample sets with labels indicating pipeline sedimentation into training and validation sets, constructing an intelligent pipeline sedimentation diagnosis algorithm that integrates Gramian Angular Summation Field (GASF), convolutional neural networks (CNNs), bidirectional long short-term memory (LSTM) neural networks, and attention mechanisms, and introducing physical knowledge constraints into loss function of the intelligent pipeline sedimentation diagnosis algorithm, wherein the physical knowledge constraints are extracted from the hydraulic models of changes in drainage pipeline inlet and outlet flow at different levels of sedimentation; the GASF and CNNs are used to process data of the input sample set; bidirectional LSTM neural networks are responsible for feature extraction and dimension reduction of blockages; a purpose of the attention mechanisms is to classify results of pipeline sedimentation.

5. The maintenance decision-making method for drainage pipeline-based waterlogging warning, applied to the unmanned underwater vehicle (UUV) as described in claim 1, comprising:

based on diagnosis results of drainage pipeline sedimentation diseases in a study area output by a drainage pipeline sedimentation disease diagnosis model, building a rainfall-runoff numerical model of drainage pipeline sedimentation to obtain simulated data about waterlogging;

constructing training, validation, and test sets of the waterlogging warning model by using the diagnosis results of drainage pipeline sedimentation diseases in a study area output by a drainage pipeline sedimentation disease diagnosis model and the simulated data about waterlogging;

by training the waterlogging warning model with the training, validation, and test sets, obtaining an optimal waterlogging warning model;

wherein, a deep learning algorithm in the waterlogging warning model is consisted of one-dimensional and two-dimensional convolutional neural networks, long short-term memory networks, and attention mechanisms, physics knowledge-guided deep learning algorithms are embedded in the waterlogging warning model, and the physical knowledge is extracted from a hydraulic model of changes in drainage pipeline inlet and outlet flow at different levels of sedimentation and improved coupled one-dimensional and two-dimensional urban surface and underground connection models;

by using the outputs of the optimal drainage pipeline sedimentation disease diagnosis model and the optimal waterlogging warning model, building an optimal pipeline maintenance decision-making model based on multi-objective optimization and waterlogging damage assessment methods consisted of triangular type-2 fuzzy sets and dynamic proportional substitution methods;

when deploying UUVs vehicles at the inlets and outlets of drainage pipelines in a study area, collecting data and uploading an output of the drainage pipeline sedimentation disease diagnosis model to the external server by each of the unmanned surface vehicle deployed at the inlet or outlet of drainage pipelines, and generating a pipeline sedimentation database by the external server from the output of the drainage pipeline sedimentation disease diagnosis model of each UUV deployed at the inlet or outlet of drainage pipelines in a study area; and by selected UUVs deployed at the inlets and outlets of drainage pipelines closest to the server, from the generated pipeline sedimentation database as an input, outputting waterlogging warning results and optimal decisions respectively by using the optimal waterlogging warning model and the optimal pipeline maintenance decision-making model based on multi-objective optimization and waterlogging damage assessment methods.

6. The maintenance decision-making method for drainage pipeline-based waterlogging warning as described in claim 5 characterized in that the process of building the waterlogging warning model comprises:

constructing hydraulic models of drainage pipelines at different levels of sedimentation;

performing numerical simulations of the hydraulic models of drainage pipelines in a state of sedimentation, calibrating hydraulic parameters related to flow velocity and flow indicators;

improving 1D and 2D coupled urban surface and underground models from perspective of horizontal surface connections and vertical surface-underground connections based on constructed hydraulic models of drainage pipelines at different levels of sedimentation;

using the improved coupled 1D and 2D urban surface and underground models to generate sample sets of different conditions of pipeline sedimentation labeled with waterlogging results;

constructing a deep learning algorithm combining 1D and 2D convolutional neural networks (CNNs), long short-term memory (LSTM) networks, and attention mechanisms, wherein the 1D and 2D CNNs are responsible for multi-dimensional and multi-scale feature extraction of inlet and outlet flow data of drainage pipelines; the LSTM networks perform feature fusion and dimension reduction of features extracted by the 1D and 2D CNNs over time series, and attention mechanism classifies and outputs the final waterlogging warning results; and introducing hydraulic models of drainage pipelines at different levels of sedimentation and physical knowledge constraints from the improved 1D and 2D coupled urban surface and underground models into the loss function of the deep learning algorithm combining 1D and 2D CNNs, LSTM networks, and attention mechanisms; training and calibrating parameters in the model using sample sets of different conditions of pipeline sedimentation labeled with waterlogging results to obtain the waterlogging warning model.

7. The maintenance decision-making method for drainage pipeline-based waterlogging warning as described in claim 5 characterized by output of optimal decisions, comprising:

obtaining an waterlogging damage assessment method based on the triangular type-2 fuzzy sets and dynamic proportional substitution methods by introducing triangular type-2 fuzzy sets and dynamic proportional substitution methods to migrating sample data of multiple cities to a loss rate sample matrix of the study area; and combining the output of the waterlogging warning model; wherein formulaic expression of waterlogging damage rates in waterlogging damage assessment methods is as follows:

$f(s)=\chi_f\, e^{(k\sqrt{s}+b)}$, wherein f(s) is the waterlogging damage rate, s is the corresponding waterlogging depth value, k and b are dynamic proportional substitution parameters, $\chi_f$ represents main membership function of the triangular type-2 fuzzy set of property density in a study area; based on historical property density survey data in the study area, drawing the coordinates of the three vertices $(\gamma_1,m^*)$, $(\gamma_2,1)$, $(\gamma_3,n^*)$ of triangular fuzzy set depicting property density in the study area; with $\alpha$ as a cut-set value, $\xi$ representing the triangular type-2 fuzzy set of property density in the study area, $\xi\xi$ necessity measure $Nec(\xi\geq\alpha)$ and main membership function $\chi_f$ are expressed as:

$$Nec(\xi \geq \alpha) = \begin{cases} 1, & \text{if } 0 \leq \alpha \leq \gamma_1 \\ m^*, & \text{if } \gamma_1 < \alpha \leq \gamma_2, \\ 0, & \text{if } \gamma_2 < \alpha \leq 1 \end{cases}, \chi_f = sup\{\alpha \wedge Nec(\xi \geq \alpha)\},$$

wherein sup denotes a supremum in mathematical operation;

by using minimum waterlogging damage caused by blocked drainage pipelines, minimum drainage pipeline maintenance cost, and maximum economic benefits as constraints, and combining the waterlogging damage assessment methods, constructing an optimal pipeline maintenance decision-making model based on multi-objective optimization and the waterlogging damage assessment methods; wherein a calculation method of waterlogging damage is as follows:

Waterlogging damage xi=property density× inundated area×waterlogging damage rate an unit of property density is yuan/m² and an unit of submerged area is m²;

a calculation method of drainage pipeline maintenance cost $y_i$ is as follows:

$y_i$-sedimentation length*sedimentation level*maintenance cost basis*fuzzy coefficient of maintenance cost;

a calculation of maintenance cost fuzzy coefficient Meb uses empirical data of historical maintenance to construct a triangular type-2 fuzzy set $\xi$; and combines the three vertex coordinates $((\gamma_1,m^*), (\gamma_2,1), (\gamma_3,n^*))$ of the triangular type-2 fuzzy set and the cut-set value $\alpha$, $\xi$'s credibility measure $Cre(\xi\geq\alpha)$ and maintenance cost fuzzy coefficient $M_{cb}$ is expressed as:

$$Cre(\xi \geq \alpha) = \begin{cases} 1, & \text{if } 0 \leq \alpha \leq \gamma_1 \\ \dfrac{1+m^*}{2}, & \text{if } \gamma_1 < \alpha \leq \gamma_2 \\ \dfrac{n^*}{2}, & \text{if } \gamma_2 < \alpha \leq \gamma_3 \\ 0, & \text{if } \gamma_3 < \alpha \leq 1 \end{cases}, M_{cb} = \sup_{\alpha \in [0,1]} \{\alpha \wedge Cre(\xi \geq \alpha)\};$$

while ensuring there is no risk to personnel, calculating whether maintenance measures are necessary for the $i^{th}$ segment of drainage pipelines, and defining the objective profit function $$Tar = \sum_{i=1}^{M}(-a_i x_i - b_i y_i),$$

wherein M represents the total number of drainage pipelines, $a_i$ indicates whether sedimentation has occurred in the $i^{th}$ segment of drainage pipelines, $b_i$ denotes whether maintenance measures are implemented for the $i^{th}$ segment, and if yes, then $$\begin{cases} a_i = 0 \\ b_i = 1 \end{cases};$$

if no, then $$\begin{cases} a_i = 1 \\ b_i = 0 \end{cases};$$

and when the constraint is to maximize the target profit function $$\mathrm{Tar} = \sum_{i=1}^{M} (-a_i x_i - b_i y_i)$$

(i.e., max (Tar)), outputting optimal decisions on all pipeline segments within the specified area.

8. The maintenance decision-making method for drainage pipeline-based waterlogging warning as described in claim 5 characterized in that the method also comprises:

visualizing waterlogging warning results and optimal decisions output by the UUVs deployed at the drainage pipeline inlets and outlets closest to the server and the sedimentation database of drainage pipelines on a comprehensive decision-making platform for drainage pipelines deployed on the server to achieve an integrated decision-making system for drainage pipelines, which comprises:

by using the Doppler ultrasound module, three-axis gyroscope, high-definition infrared camera, and non-contact liquid level gauge on the UUVs, acquiring multi-sensor data, and transmitting and storing on the comprehensive decision-making platform for drainage pipelines through wireless communication module; acquiring visualization of output results of the UUV's drainage pipeline sedimentation diagnosis model, waterlogging warning model, and optimal maintenance decision-making model by the comprehensive decision-making platform for drainage pipelines; based on a browser/server access control architecture, developing and deploying an integrated drainage pipeline decision-making system comprising UUVs, multi-sensor data, and the comprehensive decision-making platform; enabling real-time monitoring of drainage pipelines, diagnosis of pipeline sedimentation, waterlogging warnings, and optimal maintenance decision-making.

* * * * *